US007155960B2

(12) United States Patent
Arii et al.

(10) Patent No.: US 7,155,960 B2
(45) Date of Patent: Jan. 2, 2007

(54) TEMPERATURE-PROGRAMMED DESORBED GAS ANALYZING APPARATUS

(75) Inventors: Tadashi Arii, Tokyo (JP); Yoshihiro Takata, Tokyo (JP); Shuichi Matsuo, Tokyo (JP)

(73) Assignee: Rigaku Corporation, Tokyo (JP)

( * ) Notice: Subject to any disclaimer, the term of this patent is extended or adjusted under 35 U.S.C. 154(b) by 99 days.

(21) Appl. No.: 10/972,327

(22) Filed: Oct. 26, 2004

(65) Prior Publication Data

US 2005/0086997 A1 Apr. 28, 2005

(30) Foreign Application Priority Data

Oct. 27, 2003 (JP) ............................ 2003-365417

(51) Int. Cl.
*B01D 59/33* (2006.01)
*H01J 49/26* (2006.01)

(52) U.S. Cl. ..................................... 73/31.05; 250/288

(58) Field of Classification Search ............... 73/19.02, 73/19.12, 23.21, 23.22, 23.35, 23.37, 28.01, 73/28.02, 28.04, 28.05, 28.06, 31.05, 31.07; 250/288, 289

See application file for complete search history.

(56) References Cited

U.S. PATENT DOCUMENTS 4,902,891 A * 2/1990 Vestal ........................ 250/281
5,552,600 A * 9/1996 Davies et al. ............... 250/286
5,565,679 A * 10/1996 Tanner et al. ............... 250/288
5,742,050 A 4/1998 Amirav et al.
5,869,344 A * 2/1999 Linforth et al. ............. 436/173
6,265,717 B1 * 7/2001 Sakata et al. ............... 250/289
6,576,898 B1 * 6/2003 Waki .......................... 250/292
6,797,947 B1 * 9/2004 Russ et al. .................. 250/288
2003/0122069 A1 * 7/2003 Kato .......................... 250/288

(Continued)

FOREIGN PATENT DOCUMENTS

EP 0 700 068 A1 3/1996

(Continued)

OTHER PUBLICATIONS

Journal of the Mass Spectrometry Society of Japan, vol. 46, No. 4, pp. 402 and 403, 1998.

*Primary Examiner*—Hezron Williams
*Assistant Examiner*—David A. Rogers
(74) *Attorney, Agent, or Firm*—Westerman, Hattori, Daniels & Adrian, LLP.

(57) ABSTRACT

A temperature-programmed desorbed gas analyzing apparatus including a sample chamber 1 in which a sample S is disposed, an infrared heating furnace 2 for heating the sample S disposed in the sample chamber 1, a measuring chamber 3 in which gas desorbed from the sample S by heating is introduced, a turbo molecular pump 4 for reducing the pressure in the measuring chamber 3, a mass spectrometer 5 having a gas detection portion 5*a* disposed in the measuring chamber 3, an intermediate pressure-reduced chamber 6 provided between the sample chamber 1 and the measuring chamber 3, a first orifice 7 which the intermediate pressure-reduced chamber 6 and the sample chamber 1 intercommunicate with each other, and a second orifice 8 through which the intermediate pressure-reduced chamber 6 and the measuring chamber 3 intercommunicate with each other, and the desorbed gas occurring in the sample chamber 1 is introduced through the first orifice 7, the intermediate pressure-reduced chamber 6 and the second orifice 8 into the measuring chamber 3. The pressure in the intermediate pressure-reduced chamber 6 or the measuring chamber 3 is controlled by pressure adjusting unit so as to be fixed.

4 Claims, 4 Drawing Sheets

U.S. PATENT DOCUMENTS

| | | | | |
|---|---|---|---|---|
| 2003/0209666 | A1 * | 11/2003 | Hirabayashi et al. | 250/288 |
| 2004/0011955 | A1 * | 1/2004 | Hirano et al. | 250/288 |
| 2004/0262512 | A1 * | 12/2004 | Tobita et al. | 250/288 |

FOREIGN PATENT DOCUMENTS

| | | | | |
|---|---|---|---|---|
| JP | 09270244 | A | * | 10/1997 |
| JP | 10325827 | A | * | 12/1998 |

* cited by examiner

TEMPERATURE-PROGRAMMED DESORBED GAS ANALYZING APPARATUS

BACKGROUND OF THE INVENTION

1. Field of the Invention

The present invention relates to a temperature-programmed desorbed gas analyzing apparatus which is one type of thermal analyzing apparatus, and particularly to an improvement of a temperature programmed desorbed gas analyzing apparatus adopting a gas collecting system called as a skimmer interface system.

2. Description of the Related Art

The temperature-programmed desorbed gas analyzing method is a thermal analyzing method for measuring the amount of generated gas desorbed from a solid sample as a function of sample temperature when the temperature of the sample is increased at a preselected constant rate, and it is also called as TDS (Thermal. Desorption Spectroscopy) or TPD (Temperature Programmed Desorption).

The temperature-programmed desorbed gas analyzing method is carried out by using a temperature-programmed desorbed gas analyzing apparatus. Temperature-programmed desorbed gas analyzing apparatuses having various structures have been hitherto proposed, and a temperature-programmed desorbed gas analyzing apparatus adopting a gas collecting system called as a skimmer interface system is known as one of these temperature-programmed desorbed gas analyzing apparatuses.

This type of temperature-programmed desorbed gas analyzing apparatus is disclosed in "Journal of the Mass Spectrometry Society of Japan", Vol. 46/No. 4, pp402–403 in 1998.

The apparatus disclosed by the above paper is equipped with a sample chamber 101 in which a sample is disposed, a heating furnace 102 for heating the sample, a measuring chamber 103 into which gas desorbed from the sample S by heating is introduced, a turbo molecular pump 104 for reducing the pressure in the measuring chamber 103, and a mass spectrometer 105 having a gas detector 105*a* (ion source) disposed in the measuring chamber 103 as shown in FIG. 4.

The inside of the sample chamber 101 is set to ambient pressure. An intermediate pressure-reduced chamber 106 is provided between the sample chamber 101 and the measuring chamber 103. A first orifice 107 is formed between the intermediate pressure-reduced chamber 106 and the sample chamber 101, and a second orifice 108 is formed between the intermediate pressure-reduced chamber 106 and the measuring chamber 103. Gas generated in the sample chamber 101 is collected through the orifices 107 and 108, and introduced into the measuring chamber 103.

The pressure in the measuring chamber 103 is reduced by the turbo molecular pump 104. When the inside of the sample chamber 101 is heated by the heating furnace 102, the temperature of gas existing in the sample chamber 101 is increased, and the gas kept at high temperature in the sample chamber 101 is introduced through the intermediate pressure-reduced chamber 106 into the measuring chamber 103. When the temperature of the gas introduced into the measuring chamber 103 is high, the pressure in the measuring chamber 103 is increased in proportion to the temperature of the gas. Therefore, the pressure in the measuring chamber 103 is increased although the turbo molecular pump 104 is activated to reduce the pressure in the measuring chamber 103, so that the detection sensitivity of the mass spectrometer 105 is reduced.

The reduction in sensitivity which is caused by temperature variation of gas introduced into the measuring chamber as described above has been hitherto treated as being within the range of an error.

SUMMARY OF THE INVENTION

The inventors of the present invention have been dedicated to studies for suppressing the reduction in sensitivity as described above, and finally have implemented the present invention.

That is, the present invention has an object to provide a temperature-programmed desorbed gas analyzing apparatus for suppressing reduction in detection sensitivity of desorbed gas which is caused by temperature variation of gas introduced into a measuring chamber, thereby achieving a high-precision detection result.

According to the present invention, there is provided a temperature-programmed desorbed gas analyzing apparatus comprising: a sample chamber in which a sample is disposed; a heating unit for heating the sample disposed in the sample chamber; a measuring chamber in which gas desorbed from the sample by heating is introduced; a pressure-reducing unit for reducing the pressure in the measuring chamber; a mass spectrometer having a gas detector disposed in the measuring chamber; an intermediate pressure-reduced chamber provided between the sample chamber and the measuring chamber; a first orifice through which the intermediate pressure-reduced chamber and the sample chamber intercommunicate with each other, and a second orifice through which the intermediate pressure-reduced chamber and the measuring chamber intercommunicate with each other, wherein desorbed gas occurring in the sample chamber is introduced through the first orifice, the intermediate pressure-reduced chamber and the second orifice into the measuring chamber.

The temperature-programmed desorbed gas analyzing apparatus of the present invention is further equipped with a pressure adjusting unit for controlling the pressure of the intermediate pressure-reduced chamber so that the pressure of the intermediate pressure-reduced chamber is fixed.

The pressure of the intermediate pressure-reduced chamber is controlled to be fixed by the pressure control unit, whereby pressure variation caused by temperature increase of the gas introduced from the sample chamber through the intermediate pressure-reduced chamber into the measuring chamber is adjusted in the intermediate pressure-reduced chamber. As a result, the pressure in the measuring chamber is also stabilized, and the reduction in detection sensitivity of the mass spectrometer to the desorbed gas can be suppressed.

Here, the pressure adjusting unit may comprise a pressure detecting unit for detecting the pressure in the intermediate pressure-reduced chamber, a gas exhaust unit for exhausting gas in the intermediate pressure-reduced chamber by suction, and a control unit for controlling the gas exhaust unit on the basis of the value of the pressure in the intermediate pressure-reduced chamber which is detected by the pressure detecting unit so that the pressure in the intermediate pressure-reduced chamber is fixed.

A target value of the pressure in the intermediate pressure-reduced chamber is set to about $10^2$ Pa, for example. However, the target value of the present invention is not limited to the above value, and it is practically preferable to set the target value to a proper value in comprehensive consideration of various conditions. On the other hand, a high-vacuum atmosphere of $10^{-3}$ Pa is required to be formed in the measuring chamber, for example.

Even when the pressure in the intermediate pressure-reduced chamber is controlled to be fixed, it is strictly unavoidable that a slight error occurs. However, an error of the pressure value in the intermediate pressure-reduced chamber at $10^{2}$ Pa may cause great pressure variation in the measuring chamber under the high-vacuum atmosphere of $10^{-3}$ Pa.

Therefore, when the pressure in the intermediate pressure-reduced chamber is controlled by the pressure adjusting unit so that the pressure in the measuring chamber is fixed, the pressure in the measuring chamber is further stabilized, and the reduction in detection sensitivity of the mass spectrometer to the desorbed gas can be further suppressed.

The pressure adjusting unit may comprise a pressure detecting unit for detecting the pressure in the measuring chamber, a gas exhaust unit for exhausting gas in the intermediate pressure-reduced chamber by suction, and a control unit for controlling the gas exhaust unit on the basis of the value of the pressure in the measuring chamber which is detected by the pressure detecting unit so that the pressure in the measuring chamber is fixed.

The gas exhaust unit may comprises a vacuum pump, a gas exhaust passage through which the vacuum pump intercommunicates with the intermediate pressure-reduced chamber, and a gas supply unit for supplying gas such as air, inert gas or the like into the gas exhaust passage.

The control unit may control the amount of gas supplied to the gas exhaust passage by the gas supply unit.

When an adjusting valve for adjusting the gas suction amount of the vacuum pump is provided to the gas exhaust passage, the gas supply unit supplies gas to the upstream side of the adjusting valve.

The present invention is characterized in that the pressure in the intermediate pressure-reduced chamber or the pressure in the measuring chamber is controlled to be fixed as described, however, it is needless to say that it is impossible to fix the pressure in the intermediate pressure-reduced chamber or the measuring chamber in strict sense. Accordingly, in the present invention, “the pressure in the intermediate pressure-reduced chamber or the pressure in the measuring chamber is controlled to be fixed” means that the pressure variation caused by the temperature increase of the gas introduced into each chamber is suppressed to approach the pressure to a target value.

DETAILED DESCRIPTION OF THE PREFERRED EMBODIMENTS

Preferred embodiments according to the present invention will be described hereunder with reference to the accompanying drawings.

Figure 1:
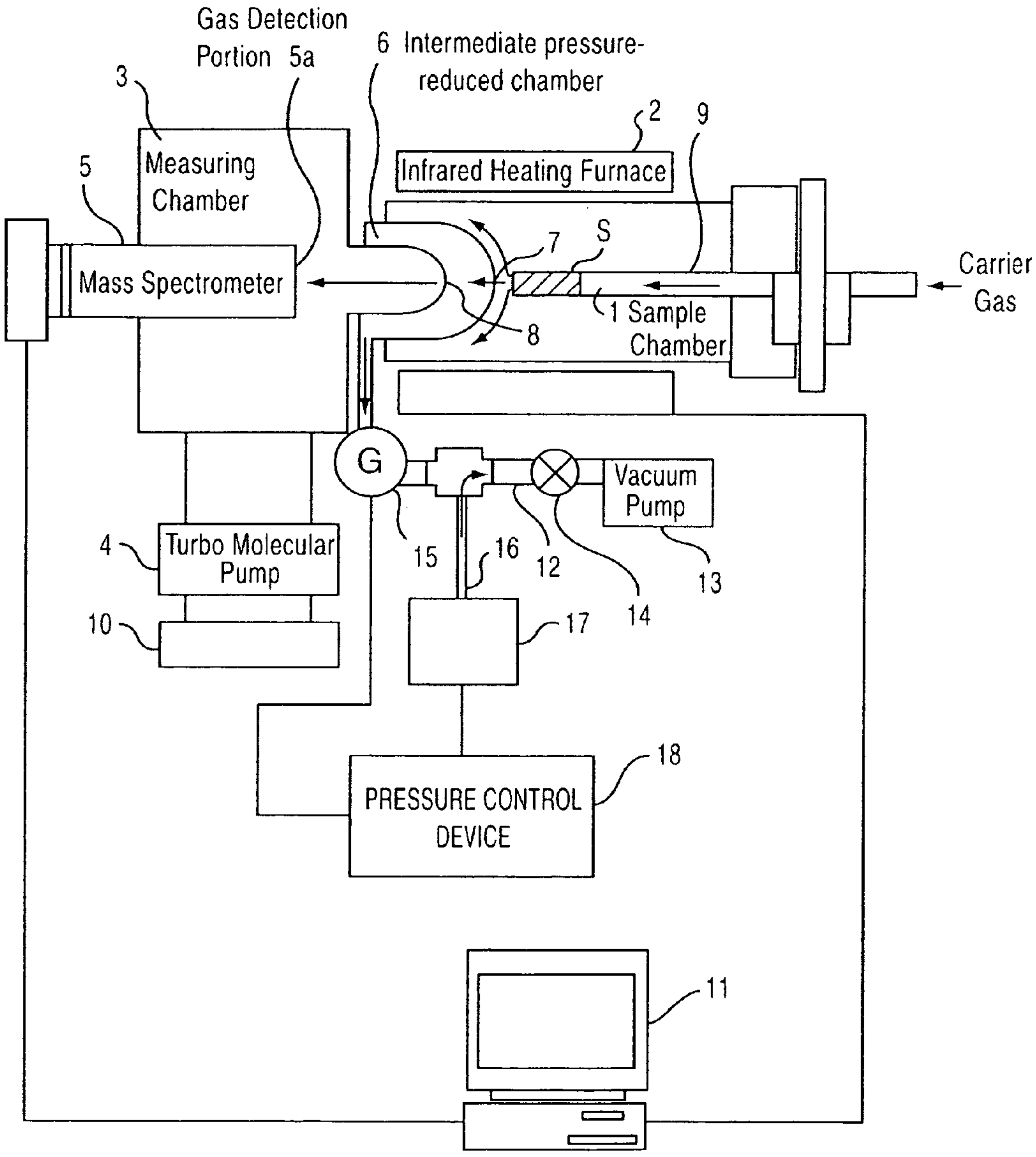
FIG. 1 is a schematic diagram showing the construction of a temperature-programmed desorbed gas analyzing apparatus according to a first embodiment of the present invention.

FIG. 1 is a diagram showing the construction of a temperature-programmed desorbed gas analyzing apparatus according to a first embodiment of the present invention.

The temperature-programmed desorbed gas analyzing apparatus shown in FIG. 1 has a sample chamber 1 in which a sample is disposed, an infrared heating furnace 2 (heating unit) for heating the sample disposed in the sample chamber 1 from the surrounding side thereof, a measuring chamber 3 into which gas desorbed from the sample S by heating is introduced, a turbo molecular pump 4 (pressure reducing unit) for reducing the pressure in the measuring chamber 3, a mass spectrometer 5 having a gas detector 5*a* (ion source) disposed in the measuring chamber 3, an intermediate pressure-reduced chamber 6 provided between the sample chamber 1 and the measuring chamber 3, a first orifice 7 through which the intermediate pressure-reduced chamber 6 and the sample chamber 1 intercommunicate with each other, and a second orifice 8 through which the intermediate pressure-reduced chamber 6 and the measuring chamber 3 intercommunicate each other.

The sample chamber 1 is formed of a protection pipe 9 of quartz glass or the like, and the sample S is disposed in the hollow portion of the protection pipe 9. The protection pipe 9 is freely movable in the right and left direction of FIG. 1, and when the sample S is exchanged, the protection pipe 9 is moved to the right side of FIG. 1 and then taken out from the sample chamber 1. Both the end faces of the protection 9 are opened, and the inside of the hollow portion thereof is set to the ambient pressure. Carrier gas is supplied from the right end face (base face) of the protection pipe 9 of FIG. 1 into the hollow portion of the protection pipe 9, and discharged from the left end face (tip face) of the protection pipe 9. Desorbed gas occurring from the sample S by heating is fed out from the tip face of the protection pipe 9 by the carrier gas. Inert gas such as helium gas or the like is used as the carrier gas.

The first orifice 7 is provided in the neighborhood of the tip end of the protection pipe 9 so as to confront the tip end of the protection pipe 9. The second orifice 8 is provided so as to be spaced from the first orifice 7 at a fixed interval and confront the first orifice 7. The intermediate portion between the first and second orifices corresponds to the intermediate pressure-reduced chamber 6.

The inside of the measuring chamber 3 is kept to an enclosed space, and a high-vacuum atmosphere is formed by the turbo molecular pump 4. A roughing vacuum pump 10 (for example, rotary pump or dry pump) is affixed to an exhaust passage based on the turbo molecular pump 4. First, the inside of the measuring chamber 3 is exhausted under vacuum by the vacuum pump 10, and then the high-vacuum atmosphere is held by the turbo molecular pump 4.

The gas detector 5*a* of the mass spectrometer 5 is disposed so as to confront the second orifice 8. The infrared heating furnace 2 and the mass spectrometer 5 described above are automatically controlled by a measurement control device 11, and the amount of gas occurring due to temperature increase of the sample S is detected.

The vacuum pump 13 (for example, rotary pump or dry pump) intercommunicates with the intermediate pressure-reduced chamber 6 through a gas exhaust passage 12, and the inside of the intermediate pressure-reduced chamber 6 is sucked and exhausted by the vacuum pump 13 to reduce the pressure in the intermediate pressure-reduced chamber 6. An adjusting valve 14 is provided in the gas exhaust passage 12 in the neighborhood of the vacuum pump 13. The vacuum pump 13 is operated at all times, and the exhaust amount is adjusted by the adjusting valve 14.

Furthermore, a pressure gauge 15 (pressure detecting unit) is provided in the gas exhaust passage 12, and the pressure of the intermediate pressure-reduced chamber 6 is detected by the pressure gauge 15.

A gas supply passage 16 intercommunicates with the intermediate portion of the gas exhaust passage 12, and gas such as air, inert gas (for example, helium gas) or the like is supplied from a gas supply source 17 through the gas supply passage 16 to the gas exhaust passage 12.

Here, the gas supply passage 16 intercommunicates with the gas exhaust passage 12 at the upstream side of the adjusting valve 14. When gas is supplied to the downstream side of the adjusting valve, the gas is immediately sucked and exhausted by the vacuum pump 13, and thus the pressure at the upstream side of the adjusting valve 14 cannot be varied with high sensitivity. On the other hand, the upstream side of the adjusting valve 14 directly intercommunicates with the intermediate pressure-reduced chamber 6 through the gas exhaust passage 12, and thus when gas is supplied to the upstream side of the adjusting valve 14, the pressure of the intermediate pressure-reduced chamber 6 can be adjusted with high sensitivity in accordance with the gas supply amount.

The gas supply source 17 is controlled by a pressure control device 18 (control unit). A target pressure value is preset in the pressure control device 18, and the gas supply source 17 is subjected to feedback control on the basis of the pressure of the intermediate pressure-reduced chamber 6 detected by the pressure gauge 15 so that the pressure of the intermediate pressure-reduced chamber 6 is equal to the target pressure value.

Next, the operation of the temperature-programmed desorbed gas analyzing device will be described.

The measurement control device 11 activates the infrared heating furnace 2 to heat the sample S in the sample chamber 1. Desorbed gas occurs from the sample S thus heated. At this time, the intermediate pressure-reduced chamber 6 is sucked and exhausted by the vacuum pump 13, so that the pressure in the intermediate pressure-reduced chamber 6 is reduced. Furthermore, the measuring chamber 3 is sucked and exhausted by the vacuum pump 10 and the turbo molecular pump 4 so that the pressure in the measuring chamber 3 is reduced to the vacuum atmosphere.

Here, the pressure of the intermediate pressure-reduced chamber 6 is reduced to about $10^2$ Pa, and the pressure of the measuring chamber 3 is reduced to about $10^{-3}$ Pa.

The desorbed gas occurring from the sample S is sucked from the first orifice 7 to the intermediate pressure-reduced chamber 6 together with the carrier gas due to the pressure difference between the sample chamber 1 and the intermediate pressure-reduced chamber 6. The desorbed gas and the carrier gas in the intermediate pressure-reduced chamber 6 is sucked from the second orifice 8 to the measuring chamber 3 due to the pressure difference between the intermediate pressure-reduced chamber 6 and the measuring chamber 3.

The desorbed gas sucked into the measuring chamber 3 is detected by the mass spectrometer 5, and the detection data thereof are transmitted to the measurement control device 11. The measurement control device 11 analyzes the amount of gas desorbed from the sample S as a temperature function of the sample S.

The pressure control device 18 carries out the feedback control on the gas supply source 17 on the basis of the pressure in the intermediate pressure-reduced chamber 6 detected by the pressure gauge 15 at all times so that the pressure in the intermediate pressure-reduced chamber is equal to a preset target value. The gas supply source 17 supplies a proper amount of gas to the gas exhaust passage 12 under the control of the pressure control device 18.

In connection with the temperature increase of the sample S, the temperature of the desorbed gas occurring from the sample S and the temperature of the carrier gas passing through the sample chamber 1 increase. When the gas whose temperature increases as described above enters the intermediate pressure-reduced chamber 6, the pressure in the intermediate pressure-reduced chamber 6 is increased. The amount of gas supplied from the gas supply source 17 is controlled so as to be maximum at the initial stage of the measurement and then reduced as the temperature of the sample S is increased. Under this control, the exhaust amount in the intermediate pressure-reduced chamber 6 by the vacuum pump 13 is increased in accordance with the pressure increase in the intermediate pressure-reduced chamber 6, so that the pressure in the intermediate pressure-reduced chamber 6 is stabilized to a value around the target value.

According to this embodiment, by fixing the pressure in the intermediate pressure-reduced chamber 6 provided at the upstream side of the measuring chamber 3, the pressure in the measuring chamber 3 is kept substantially fixed, so that the reduction in detection sensitivity of the mass spectrometer 5 to the desorbed gas can be suppressed.

Figure 2:
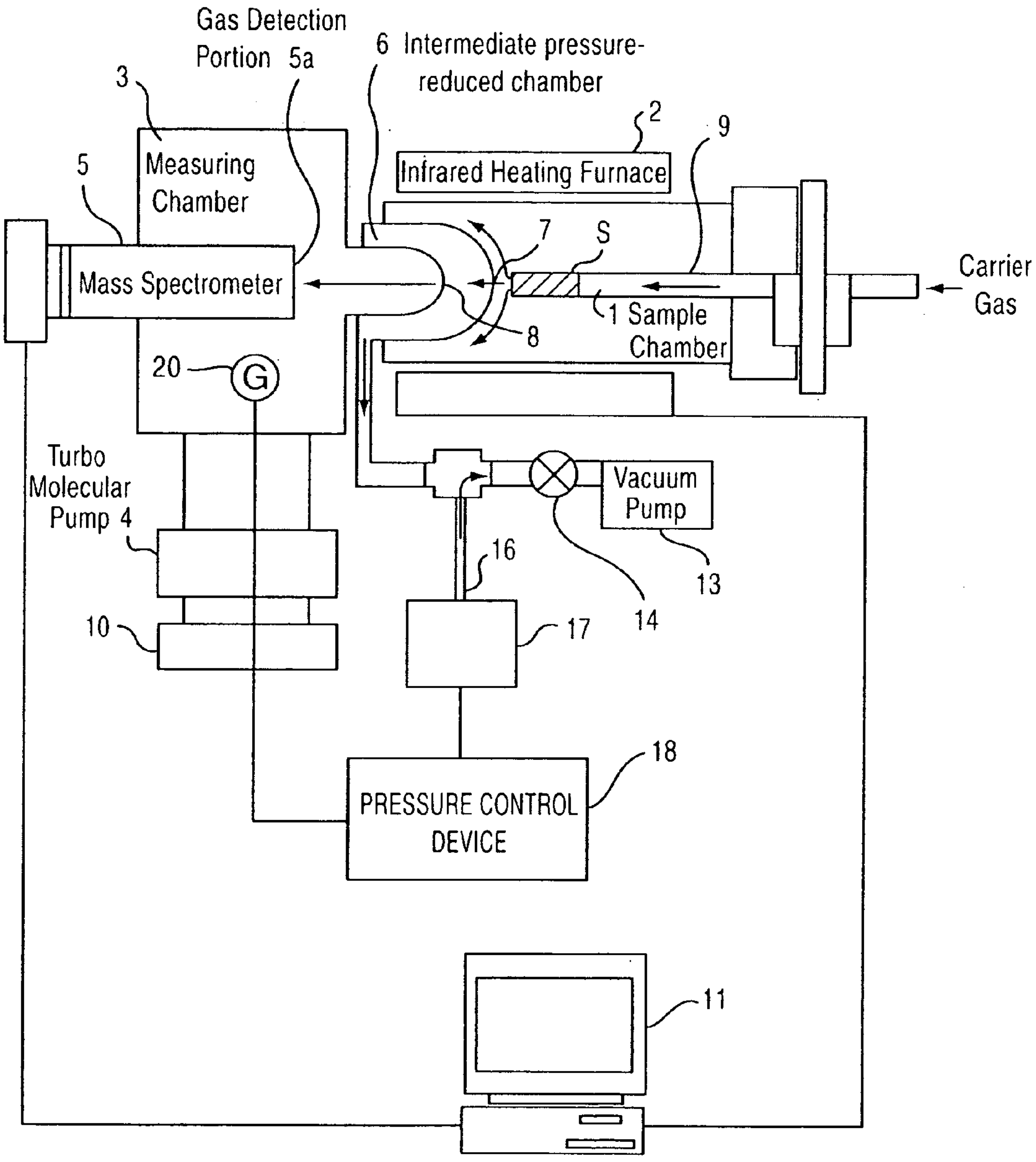
FIG. 2 is a schematic diagram showing the construction of a temperature-programmed desorbed gas analyzing apparatus according to a second embodiment of the present invention.

FIG. 2 is a diagram showing the construction of a temperature-programmed desorbed gas analyzing device according to a second embodiment of the present invention. The same elements as or corresponding elements to those of FIG. 1 are represented by the same reference numerals, the detailed description thereof is omitted from the following description.

In the second embodiment of the present invention, a pressure gauge 20 (pressure detecting unit) is provided in the measuring chamber 3, and the pressure in the measuring chamber 3 is detected by the pressure gauge 20. The detection result of the pressure gauge 20 is output to the pressure control device 18 (control unit). A target pressure value is preset in the pressure control device 18, and the gas supply source 17 is subjected to the feedback control on the basis of the pressure of the measuring chamber 3 detected by the pressure gauge 20 so that the pressure of the measuring chamber 3 is equal to the target pressure value.

In this embodiment, since the pressure value in the measuring chamber 3 is fed back to control the gas supply source 17, so that the pressure in the measuring chamber 3 is further stabilized as compared with the first embodiment, and also the reduction in detection sensitivity of the mass spectrometer 5 to the desorbed gas can be further suppressed.

The present invention is characterized in that the pressure in the measuring chamber is fixed. It is considered that if the pressure in the measuring chamber is fixed at all times, the occurrence amount of gas detected by the mass spectrometer is fixed and thus there appears no peak for the desorbed gas amount. However, most of gas sucked into the intermediate pressure-reduced chamber is carrier gas, and this carrier gas is exhausted in the intermediate pressure-reduced chamber, so that the pressure is fixed. Therefore, the mixture ratio of the gas sucked into the measuring chamber (i.e., the mixture ratio of the carrier gas and the desorbed gas from the sample)

is varied. Accordingly, most of the desorbed gas from the sample is sucked into the measuring chamber and captured by the mass spectrometer. As a result, there occurs a peak value in the amount of occurring gas even under a high-temperature atmosphere.

Figure 3A:
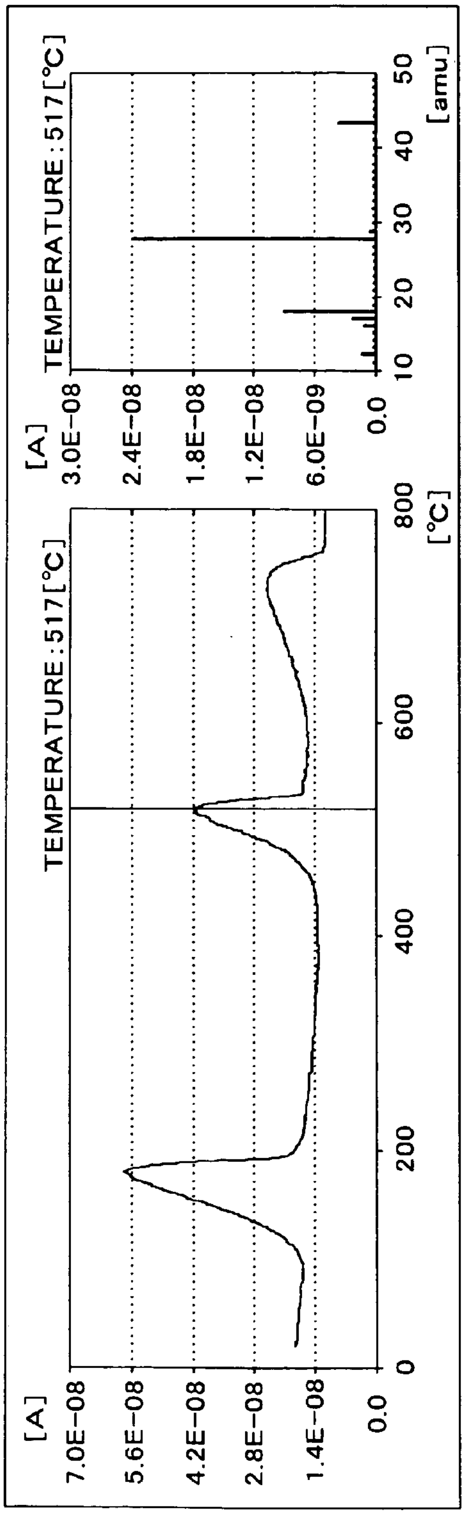
FIGS. 3A and 3B show comparative experiment data achieved by the inventors of this application.
Figure 3B:
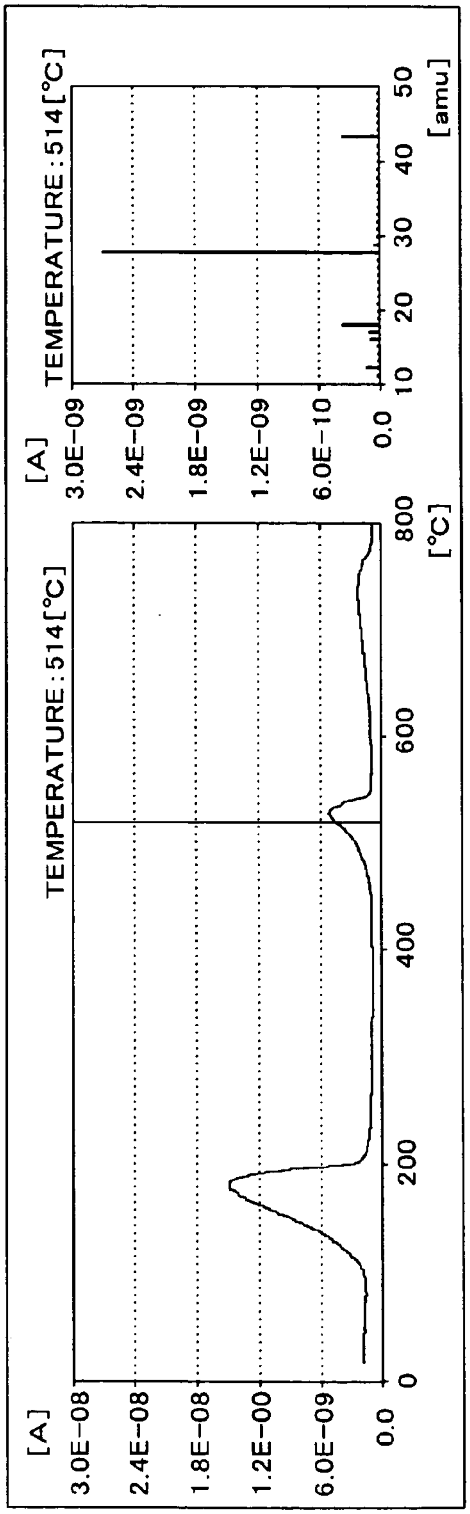
Figure 4:
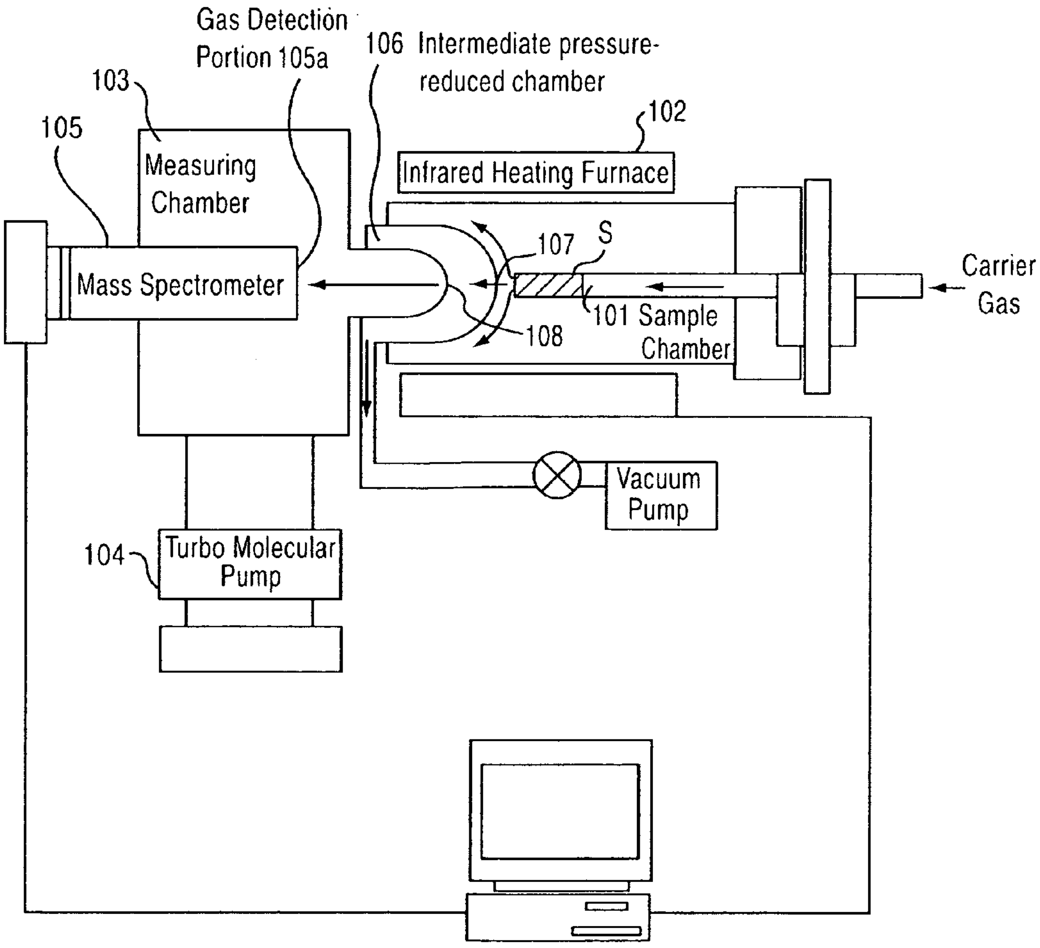
Fig.4 PRIOR ART
FIG. 4 is a diagram showing the construction of a conventional temperature-programmed desorbed gas analyzing apparatus.

FIGS. 3A and 3B are graphs showing comparative experiment data made by the inventors of this application. Specifically, FIG. 3A shows measurement data achieved when temperature-programmed desorbed gas analysis was made by using the construction of the second embodiment shown in FIG. 2, and FIG. 3B shows measurement data achieved when temperature-programmed desorbed gas analysis was made without carrying out the pressure adjusting control.

When the data shown in FIG. 3A was achieved, the pressure target value of the measuring chamber was set to about $10^{-3}$ Pa, and the pressure in the measuring chamber was controlled so as to be equal to this target value. The pressure in the intermediate pressure-reduced chamber was equal to about $10^2$ Pa.

As is apparent from FIGS. 3A and 3B, the measurement data achieved when the temperature-programmed desorbed gas analysis was made by using the construction of the second embodiment exhibits that the area of the total ion current curve at the peak value is larger. That is, it is understood that the detection sensitivity of the mass spectrometer to the desorbed gas is more enhanced.

What is claimed is:

1. A temperature-programmed desorbed gas analyzing apparatus comprising:

a sample chamber in which a sample is disposed; a heating unit for heating the sample disposed in the sample chamber;

a measuring chamber in which gas desorbed from the sample by heating is introduced; a pressure-reducing unit for reducing the pressure in the measuring chamber;

a mass spectrometer having a gas detector disposed in the measuring chamber; an intermediate pressure-reduced chamber provided between the sample chamber and the measuring chamber;

a first orifice through which the intermediate pressure-reduced chamber and the sample chamber intercommunicate with each other;

a second orifice through which the intermediate pressure-reduced chamber and the measuring chamber intercommunicate with each other, desorbed gas occurring in the sample chamber being introduced through the first orifice, the intermediate pressure-reduced chamber and the second orifice into the measuring chamber; and a pressure adjusting unit for controlling the pressure of the intermediate pressure-reduced chamber so that the pressure of the measuring chamber is fixed.

2. The temperature-programmed desorbed gas analyzing apparatus according to claim 1, wherein the pressure adjusting unit comprises a pressure detecting unit for detecting the pressure in measuring chamber, a gas exhaust unit for exhausting gas in the intermediate pressure-reduced chamber by suction, and a control unit for controlling the gas exhaust unit on the basis of the value of the pressure in the measuring chamber which is detected by the pressure detecting unit so that the pressure in the intermediate pressure-reduced chamber is fixed.

3. The temperature-programmed desorbed gas analyzing apparatus according to claim 2, wherein the gas exhaust unit comprises a vacuum pump, a gas exhaust passage through which the vacuum pump intercommunicates with the intermediate pressure-reduced chamber, and a gas supply unit for supplying gas such as air, inert gas or the like into the gas exhaust passage, wherein the control unit controls the gas supply amount to the gas exhaust passage by the gas supply unit.

4. The temperature-programmed desorbed gas analyzing apparatus according to claim 3, wherein an adjusting valve for adjusting the gas suction amount of the vacuum pump is provided to the gas exhaust passage, and the gas supply unit supplies gas to the upstream side of the adjusting valve in the gas exhaust passage.

* * * * *